(12) United States Patent
Harding (10) Patent No.: US 6,997,097 B2
(45) Date of Patent: Feb. 14, 2006

(54) AUTONOMOUS MISSION PROFILE PLANNING

(75) Inventor: William V. Harding, Arlington, TX (US)

(73) Assignee: Lockheed Martin Corporation, Bethesda, MD (US)

(*) Notice: Subject to any disclaimer, the term of this patent is extended or adjusted under 35 U.S.C. 154(b) by 694 days.

(21) Appl. No.: 09/847,224

(22) Filed: May 2, 2001

(65) Prior Publication Data

US 2003/0213358 A1 Nov. 20, 2003

(51) Int. Cl.
*B64D 1/04* (2006.01)
(52) U.S. Cl. .................. 89/1.11; 89/41.01; 89/41.07; 701/302; 342/62; 342/67
(58) Field of Classification Search ........... 89/1.11, 89/41.01, 41.03, 41.07; 244/3.15; 701/302; 342/62, 67; 760/24, 52
See application file for complete search history.

(56) References Cited

U.S. PATENT DOCUMENTS

| | | | | |
|---|---|---|---|---|
| 4,433,334 | A | * | 2/1984 | Caputi, Jr. ................ 342/450 |
| 5,200,606 | A | | 4/1993 | Krasutsky et al. .......... 250/216 |
| 5,224,109 | A | | 6/1993 | Krasutsky et al. ............ 372/29 |
| 5,285,461 | A | | 2/1994 | Krasutsky et al. ............ 372/29 |
| 5,379,966 | A | | 1/1995 | Simeone et al. ........... 244/3.11 |
| 5,435,503 | A | | 7/1995 | Johnson, Jr. et al. ...... 244/3.15 |
| 5,631,653 | A | * | 5/1997 | Reedy ....................... 342/62 |
| 5,893,085 | A | | 4/1999 | Phillips et al. ............... 706/52 |
| 5,898,483 | A | | 4/1999 | Flowers ..................... 356/4.01 |
| 6,006,145 | A | * | 12/1999 | Bessacini ................... 244/3.1 |
| 6,043,867 | A | * | 3/2000 | Saban ...................... 244/3.11 |
| 6,236,899 | B1 | * | 5/2001 | Tsang ......................... 700/90 |

OTHER PUBLICATIONS

U.S. Appl. No. 09/263,411, *Dual Mode Semi-Active Laser/Laser Radar Seeker*, filed Mar. 5, 1999, in the name of Lewis G. Minor.
U.S. Appl. No. 09/847,225, *Autonomous Mission Profile Planning*, filed May 2, 2001, in the name of William V. Harding et al.

* cited by examiner

*Primary Examiner*—J. Woodrow Eldred
(74) *Attorney, Agent, or Firm*—Williams, Morgan & Amerson, P.C.

(57) ABSTRACT

The invention includes a method and apparatus for planning a mission profile in real time on board a platform or a vehicle dispensed from a platform. In general, the mission planning technique includes ascertaining a plurality of target information, including a target location, a target velocity, and a target location error. This is followed by an autonomous determination of a pattern from the ascertained target information. In one particular implementation, the autonomous determination includes projecting along a target axis a direction opposite a target heading defined by the target velocity a distance of at least twice the target location error to establish an intersection of the target axis with the target location error; projecting left and right relative to the target axis from the intersection a distance at least as great as one-half the target location error to determine a pair of possible start points; selecting the possible start point closest to the platform; determining a dispense point; laying out a trace from the selected start point; and translating the trace along a heading defined by the target velocity a distance determined by the elapsed time of travel for the platform to the dispense point and for a vehicle from the dispense point to the start point. In other aspects, the invention includes a computing device programmed to perform this autonomous determination or a program storage device encoded with instructions for performing such a determination.

75 Claims, 9 Drawing Sheets

Q - LLMULT * TLE + X
R - TLE
S - DISPENSE OFFSET
T - ORIENTATION
$U_L$ - LEFT SIDE HEADING
$U_R$ - RIGHT SIDE HEADING
V - 0.5 * LEG LENGTH
W - PROJECTED HEADING
X - TARGET HEADING
Y - 2 * TLE
Z - PLMULT * TLE / FORMATION LEG SEPARATION

AUTONOMOUS MISSION PROFILE PLANNING

BACKGROUND OF THE INVENTION

The present invention is related to the invention disclosed and claimed in co-pending application Ser. No. 09/847,225, entitled "Autonomous Mission Profile Planning," filed on an even date herewith in the name of William Van Harding, Arlin W. Gant, and Douglas R. Zimmerer and commonly assigned herewith.

1. Field of the Invention

The present invention pertains to mission profiles for weapons and reconnaissance systems, and, more particularly, to a method and apparatus for autonomous mission profile planning.

2. Description of the Related Art

The power and sophistication of modern weapons and reconnaissance systems have increased tremendously in recent years. One attribute of these systems manifesting this increase is mobility. Modem systems move much faster and much further than ever before. While battlefield conditions have never been static, the rate at which battlefield conditions change has correspondingly increased dramatically.

This fluidity in battlefield conditions emphasizes the need for flexibility in the deployment of weapons and reconnaissance systems. Weapons systems, reconnaissance systems, and other agents of military force are traditionally deployed according to a "mission profile." Mission planners gather intelligence about expected battlefield conditions pertaining to a particular military objective and then develop a mission profile by which the military objective may be accomplished. The mission profile is typically based upon numerous assumptions including, but not limited to, the expected performance of the deployed weapons system, the environmental conditions in which the deployment occurs, the expected performance of opposing weapons systems, and expected tactical responses of the enemy.

The fluidity in battlefield conditions, however, sometimes obsoletes one or more assumptions on which the mission profile is developed. For instance, the weapons system may not perform as expected; the weather may be worse than expected; an opposing weapons system may be deployed much more effectively than expected, or the enemy might do something unexpected. The theory of military tactics and strategy actually holds, in fact, that one can actually expect one or more developments of this kind to be encountered in any operation. The classic theorist Karl von Clausewitz referred to this as "the fog of war," i.e., the uncertainty arising from unexpected developments that will undoubtedly occur.

Some assumptions are more tenuous than others, and mission profiles typically contemplate alternative formulations predicated on the most probable contingencies beforehand. However, sometimes the changed conditions are so unexpected, are so critical, or are of such a degree that the mission profile as a whole becomes untenable. In such circumstances, the mission typically is either aborted or otherwise fails in its military objective.

Consider, for example, the pursuit of SCUD missile launchers by forces under United Nations ("UN") control ("UN forces") during the conflict against Iraq sometimes referred to as the "Persian Gulf War." UN forces would detect a SCUD missile launch as it occurred or shortly thereafter, and would dispatch military aircraft to destroy the launchers. UN forces enjoyed reconnaissance capabilities superior to any ever previously deployed, absolute air superiority, and the highest performance aircraft ever known. Still, UN forces never destroyed, or even damaged, a single SCUD missile launcher.

The launchers were very mobile, and Iraqi forces would begin moving them immediately upon launching their missiles. By the time UN aircraft reached the area in which they expected to find the launchers, the Iraqis had secreted them away so they could not be found. UN mission planners simply were unable to develop a mission profile capable of overcoming the capabilities of the Iraqi weapons system. The essential assumption on which the mission was planned, i.e., that the UN aircraft could arrive before the Iraqis hid the launchers, was untenable.

Consequently, as battlefield conditions become more fluid, greater emphasis is placed on flexibility in weapons and reconnaissance system deployments. A more flexible deployment permits the mission planners to contemplate a wider range of possible contingencies. All other things being equal, the more contingencies that can be accounted for beforehand the more likely the mission can be successfully completed.

The recent emphasis on "standoff" weapons and reconnaissance drones has exacerbated these considerations. Standoff weapons are weapons deployed against a target from a distance at which military personnel are relatively safe from retaliatory action. A classic example of a standoff weapon is a cruise missile, which can be launched at a target from several hundred miles away with great accuracy. Because of the distance, the personnel launching the cruise missile typically worry little about retaliation from even an otherwise dangerous target. Similarly, a reconnaissance drone may be programmed with a mission profile and launched. The reconnaissance drone then executes the mission and returns or signals information back to a central location. Either way, personnel remain behind in relative safety.

Unfortunately, standoff weapons and reconnaissance systems are not very "smart" and consequently not very flexible. Consider the cruise missile, for example. A cruise missile is programmed with a target's location and then launched. While the cruise missile can arrive at the programmed location with great accuracy, it will miss the target if the target has moved from that location. The mission planner has few options because the weapons system is not very flexible. A change in battlefield conditions (i.e., changed target location) cannot be contemplated in the mission profile because the weapons system does not have the capability. At the same time, the distance over which the cruise missile has to travel increases the probability because of the time it takes to fly the distance.

Mission profile planning is performed manually. An "analyst" sits down with some target information about a target. The target information may include the target's location and, if the target is mobile, information such as the target speed, target heading, target location error ("TLE"), and age of the information. If target information other than the target location is missing, values may be assumed. Planning the mission profile is relative if the target is stationary. However, if the target is mobile, the analyst must develop a profile under which the weapon system or reconnaissance can locate the target. This includes developing a search pattern that thoroughly covers the area in which the target may be (defined by the TLE) in an efficient manner. This can be a relatively time consuming process.

Thus, another significant problem encountered for some weapons systems and, less frequently, some reconnaissance systems is the stress of battlefield conditions. Consider a standoff weapon launched from an aircraft; for example, an air to ground missile. Although the pilot might not need to worry about retaliation from the target, the launch might occur in enemy territory over which the pilot may be subject to hostile anti-aircraft fire. The pilot may receive information about a target that may have some error in it or will have some error by the time the weapon is dispensed. A pilot under fire has neither the time nor the inclination to calculate, i.e., promulgate a new or more accurate mission profile before launching the weapon.

The present invention is directed to resolving, or at least reducing, one or all of the problems mentioned above.

SUMMARY OF THE INVENTION

The invention includes a method and apparatus for planning a mission profile in real time on board a platform or a vehicle dispensed from a platform. In general, the mission planning technique includes ascertaining a plurality of target information, including a target location, a target velocity, and a target location error. This is followed by an autonomous determination of a pattern from the ascertained target information. In one particular implementation, the autonomous determination includes projecting along a target axis a direction opposite a target heading defined by the target velocity a distance of at least twice the target location error to establish an intersection of the target axis with the target location error; projecting left and right relative to the target axis from the intersection a distance at least as great as one-half the target location error to determine a pair of possible start points; selecting the possible start point closest to the platform; determining a dispense point; laying out a trace from the selected start point; and translating the trace along a heading defined by the target velocity a distance determined by the elapsed time of travel for the platform to the dispense point and for a vehicle from the dispense point to the start point. In other aspects, the invention includes a computing device programmed to perform this autonomous determination or a program storage device encoded with instructions for performing such a determination.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

The invention includes a method for developing a mission profile in real time. The method may be used to promulgate an original mission profile or an updated mission profile, or both, depending on the implementation. In general, the method includes:

ascertaining a plurality of target information including a target location, a target velocity, and a target location error; and autonomously determining a pattern from the ascertained information.

The term "autonomous," as used herein, means under programmed control without human intervention. As will become apparent from the discussion below, the invention admits wide variation in implementation.

Figure 1:
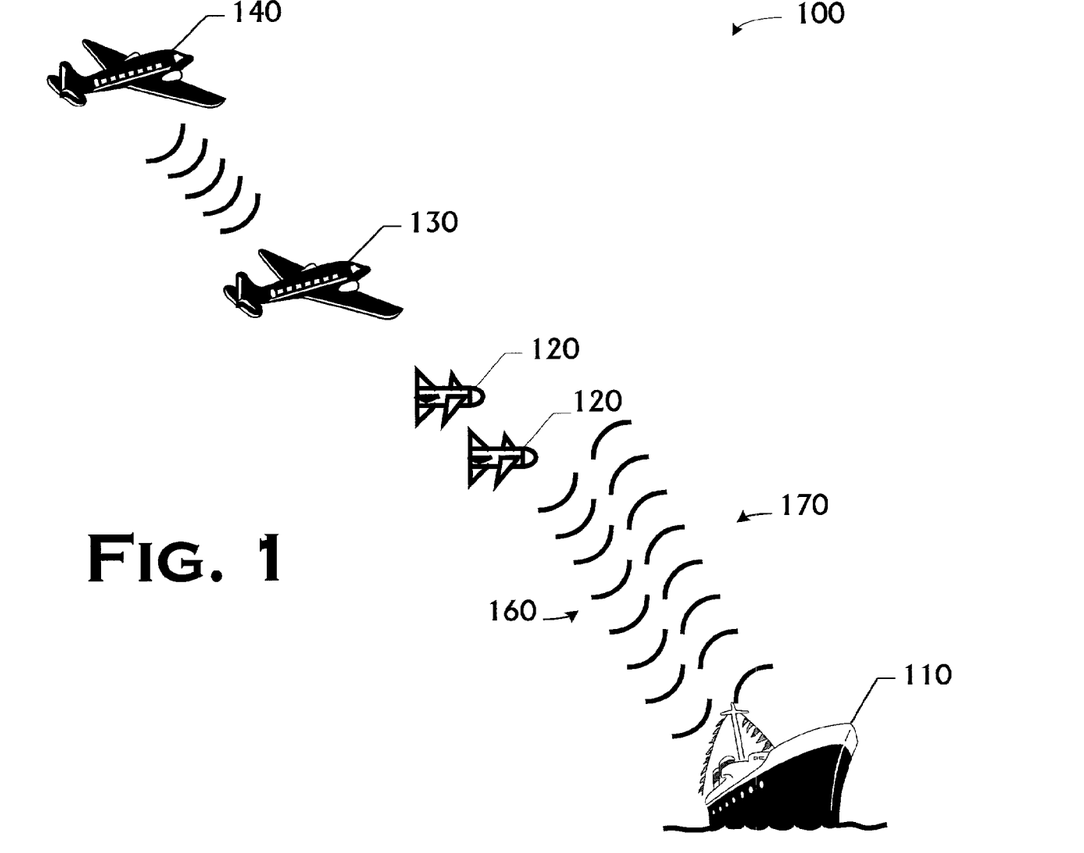
FIG. 1 depicts one particular embodiment of a mission scenario in which the present invention may be employed.

Turning now to the drawings, FIG. 1 conceptually illustrates one particular mission scenario 100 in which the invention may be employed. The mission scenario implements a method for autonomously planning a mission profile practiced in accordance with the present invention. In this particular scenario 100, the objective is to destroy the target 110 with one or more flying submunitions 120. The submunitions 120 may be flown in one or more formations, depending upon the implementation. Note, however, that the invention is not so limited. For instance, an objective in an alternative embodiment might be to locate and identify the target 110. Other alternative embodiments are disclosed below. Still other variations within the scope of the claims appended hereto will become apparent to those skilled in the art having the benefit of this disclosure.

The submunitions 120 are dispensed from an aircraft 130. In the illustrated embodiment, the aircraft 130 receives the target information from an airborne surveillance platform 140, such as an Airborne Warning and Control System ("AWACS") or Joint Surveillance Target Attack Radar System ("JSTARS") aircraft. More technically, the airborne surveillance platform 140 transmits an electromagnetic signal 160 to the aircraft 130 containing the target information.

Thus, in this manner, the target information is "ascertained" in this particular embodiment.

The aircraft 130 includes a computing device (not shown) programmed to determine a pattern for the submunitions 120 to use in searching for and locating the target 110 in accordance with the present invention. The computing device will typically be a sophisticated processor (e.g., a high performance microprocessor or digital signal processor) embedded in the aircraft 130's weapons systems. In one particular implementation, the submunitions 120 are preprogrammed with an original mission profile. Consequently, the aircraft 130 determines an "updated" or "modified" mission profile from the target information. However, the aircraft 130 may alternatively promulgate an original mission profile.

The submunitions 120 are then dispensed by the aircraft 130 in accordance with the mission profile. In some implementations, the submunitions 120 may be dispensed prior to the determination of the pattern. The submunitions 120 begin searching on the pattern determined as part of the mission profile. The submunitions 120 transmit electromagnetic signals 160 while flying on the pattern. The signals 160 are reflected by objects such as the target 110. The submunitions 120 analyze the reflected signals 170 to determine whether the object reflecting them is the target 110. This is known as "target recognition," and the submunitions 120 are said to employ an automatic target recognition system ("ATR System").

In one particular embodiment, the submunitions 120 are equipped with a "seeker head" (not shown) that employs laser RADAR, or laser ranging and detecting s ("LADAR") signals for the signals 150, 160. The basic structure and operation of this seeker head is disclosed in the following references:

U.S. Pat. No. 5,285,461, entitled "Improved Laser RADAR Transceiver," issued Feb. 5, 1994, to Loral Vought Systems Corporation (now Lockheed Martin Corporation) as assignee of the inventors Nicholas J. Krasustsky and Lewis G. Minor;

U.S. Pat. No. 5,224,109, entitled "Laser RADAR Transceiver," issued Jun. 29, 1993, to LTV Missiles and Electronics Group (now Lockheed Martin Corporation) as assignee of the inventors Nicholas J. Krasustsky and Lewis G. Minor; and U.S. Pat. No. 5,200,606, entitled "Laser RADAR Scanning System," issued Apr. 6, 1993, to LTV Missiles and Electronics Group (now Lockheed Martin Corporation) as assignee of the inventors Nicholas J. Krasustsky, Lewis G. Minor, and Edward M. Flowers.

One particular implementation of this seeker disclosed in U.S. application Ser. No. 09/263,411, entitled "Dual Mode Semi-Active Laser/Laser Radar Seeker," filed Mar. 5, 1999, in the name of the inventor Lewis G. Minor, now commonly assigned herewith to Lockheed Martin Corporation, is capable of switching between "active" and "semi-active" modes. In another implementation, the seeker head scans using a technique disclosed in U.S. Pat. No. 5,898,483, entitled "Method for Increasing LADAR Resolution," issued Apr. 27, 1999, to Lockheed Martin Corporation as assignee of the inventor Edward Max Flowers.

One advantage of using LADAR signals 160, 170 is that they provide three-dimensional data. This is particularly advantageous in recognizing and acquiring the target 110. One implementation of the present invention may employ an automatic target recognition ("ATR") system disclosed in U.S. Pat. No. 5,893,085, entitled "Dynamic Fuzzy Logic Process for Identifying Objects in Three-Dimensional Data," issued Apr. 6, 1999, to Lockheed Martin Corporation as assignee of the inventor Ronald W. Phillips. In the particular mission scenario 100, the target 110 is then destroyed, or at least attacked, once recognized and acquired.

However, the invention is not limited to these particular implementations. For instance:

any suitable seeking apparatus known to the art may be employed;

signals other than LADAR signals, including those that yield only two-dimensional data, may be used; and any suitable target recognition system known to the art may be employed. Indeed, many aspects of the present invention will be implementation specific.

One factor influencing many aspects of a given implementation is the environment in which the invention is deployed. The mission scenario 100 in FIG. 1 is an air-to-ground scenario. As used herein, "air-to-ground" shall encompass delivery from the air to a target on the surface of a body of water. However, in alternative embodiments, mission scenarios might be air-to-air or ground-to-ground, or even partially or completely underwater. For instance, in alternative embodiments, the invention might include:

a submarine launching a submersible vehicle (e.g., a torpedo) programmed to seek out and perhaps destroy an underwater or surface target;

a submarine or a submerged weapons barge launching a missile or reconnaissance drone programmed to seek out a target;

an aircraft (e.g., the aircraft 130) dispensing a reconnaissance drone programmed to seek out a target;

a ground-based facility launching a missile or a reconnaissance drone programmed to seek out a target; or a satellite or other space-based platform launching a missile programmed to seek out a target.

Thus, the aircraft 130 may more generically be described as a "platform" from which the submunitions 120 are dispensed. Similarly, the submunitions 120 might more generically be referred to as a "vehicle" dispensed by the "platform." The present invention therefore includes, in a general sense, a platform from which a vehicle is dispensed to implement a mission profile promulgated in accordance with the present invention. The more general terms "platform" and "vehicle" shall hereafter be used in describing the aircraft 130 and the submunitions 120, respectively.

The invention also admits wide variation in the manner in which the target information is ascertained. Some implementation will simply assume values for one or more of the TLE, target heading, and target speed. In one implementation in which this information is received, as in the scenario 100, the platform may receive the information from a variety of sources. For instance, the information may be received from or relayed by a satellite, or received from a ground-based facility, or from a submersible such as a submarine.

Figure 2:
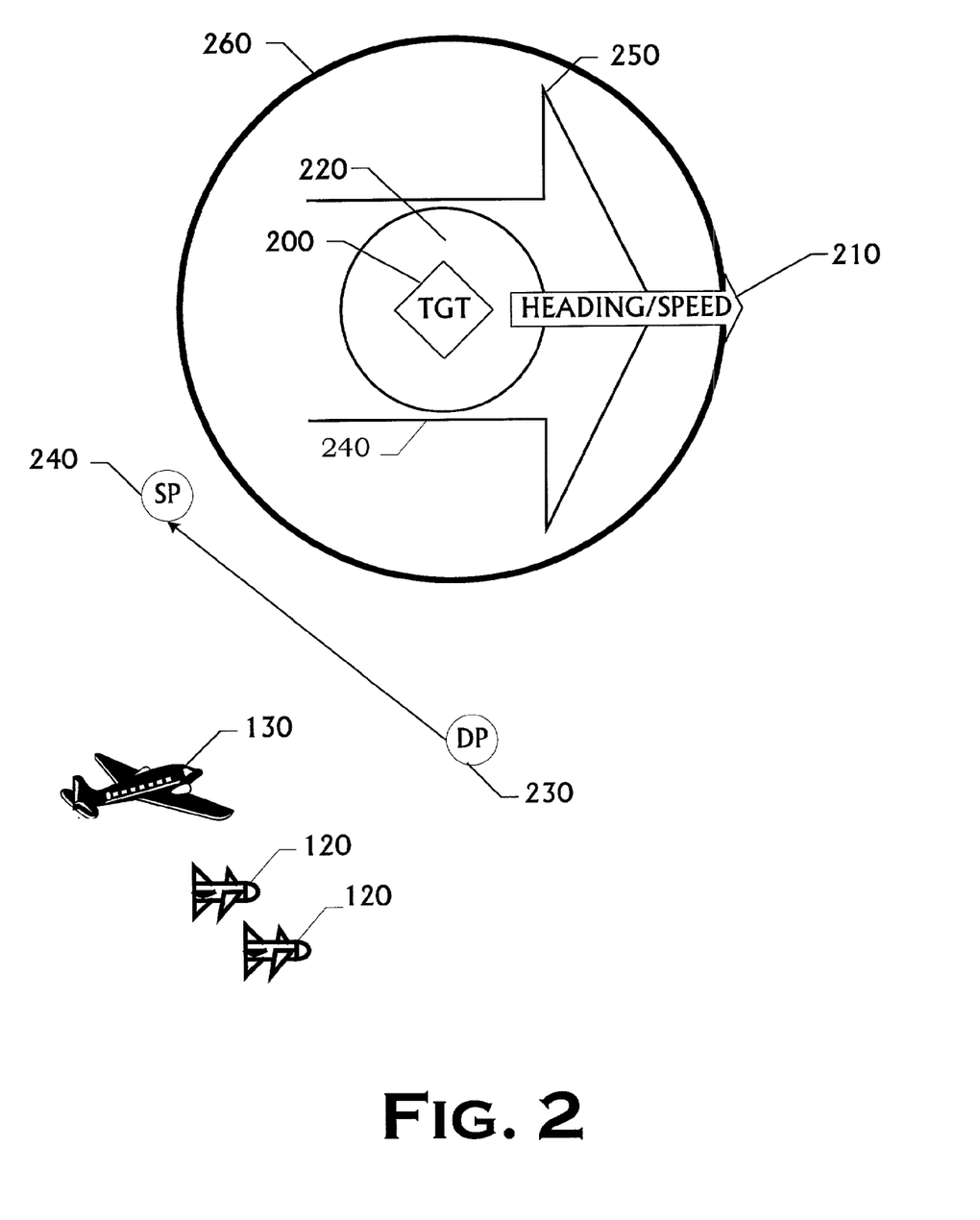
FIG. 2 illustrates some concepts regarding a mission profile relevant to the present invention.
Figure 3:
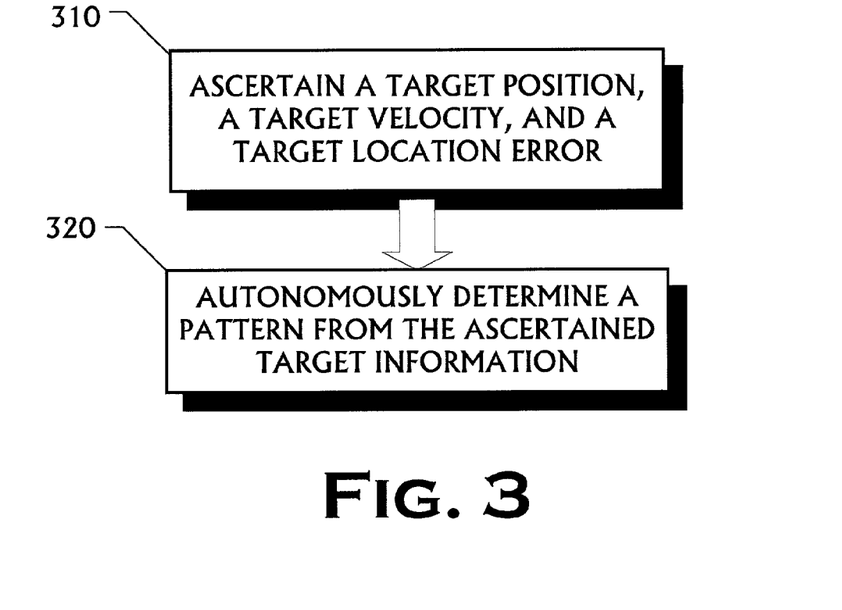
FIG. 3 charts one particular embodiment of a method practiced in accordance with the present invention.

Returning to FIG. 1, and now referring to both FIG. 2 and FIG. 3, the mission scenario 100 begins by ascertaining a plurality of target information, namely a position 200, velocity 210, and location error 220, all conceptually illustrated in FIG. 2, of the target 110, as set forth in the box 310 of FIG. 3. These parameters will be referred to as the "initial target location," "target velocity," and "base TLE," respectively. The target location 200 defines a pattern area 250 and a threat approach limit 260. The threat approach limit 260 is the boundary beyond which a dispense of the vehicles 120 would compromise the platform 130, e.g., a radar volume within which the platform 130 might be detected. Some embodiments of the present invention might be limited such that the vehicles 120 may only be dispensed from beyond the target approach limit 260. However, the invention is not so limited in all its embodiments, and some embodiments may omit any consideration of the threat approach limit 260.

Note that the velocity 310 of the target 110 is represented as the heading and speed of the target 110 in the illustrated embodiment. As will be appreciated by those skilled in the art having the benefit of this disclosure, the altitude/depth of the target 110 and/or vehicles 120 influences the "footprint" of the search. For instance, higher altitudes for the vehicles 120 yield a larger footprint, i.e., more area is searched at any given time, and permits a wider separation between legs of the search pattern. However, higher altitudes reduce the resolution of the returned data, making target identification more difficult. The altitude/depth of the vehicles 120 and the target 110 is not otherwise significant in promulgating the mission profile.

The target information is "ascertained" in the illustrated embodiment prior to launching the vehicles 120. The vehicles 120 are programmed with a predetermined mission profile that includes the target information and a preliminary pattern predicated on that information. The preliminary mission profile defines the dispense point ("DP") 230 at which the vehicles 120 are dispensed and one or more start points ("SPs") 240 at which the vehicles 120 are to start executing the pattern in accordance with the preliminary mission profile. The altitude/depth for the vehicles 120 is, in this particular embodiment, a part of the preliminary mission profile. In this embodiment, the method of the invention is actually used to update, or replan, the preliminary mission profile. However, in alternative embodiments, the vehicles 120 may be loaded aboard the platform 130 without a preliminary mission profile. In this scenario, the target information may be transmitted to the platform 130 from which a mission profile may be originally promulgated. Furthermore, in various alternative embodiments, the target information may be ascertained before or after the vehicles 120 are dispensed, depending on the implementation.

The mission scenario 100 then autonomously determines a pattern from the ascertained target information, as set forth in the box 320 of FIG. 3. As mentioned above, in the illustrated embodiment, the vehicles 120 are loaded with a preprogrammed mission profile that defines a base pattern such that the pattern determined in the box 320 is an "updated" or "modified" pattern. However, in alternative embodiments, this pattern might be an originally determined pattern.

Figure 4A:
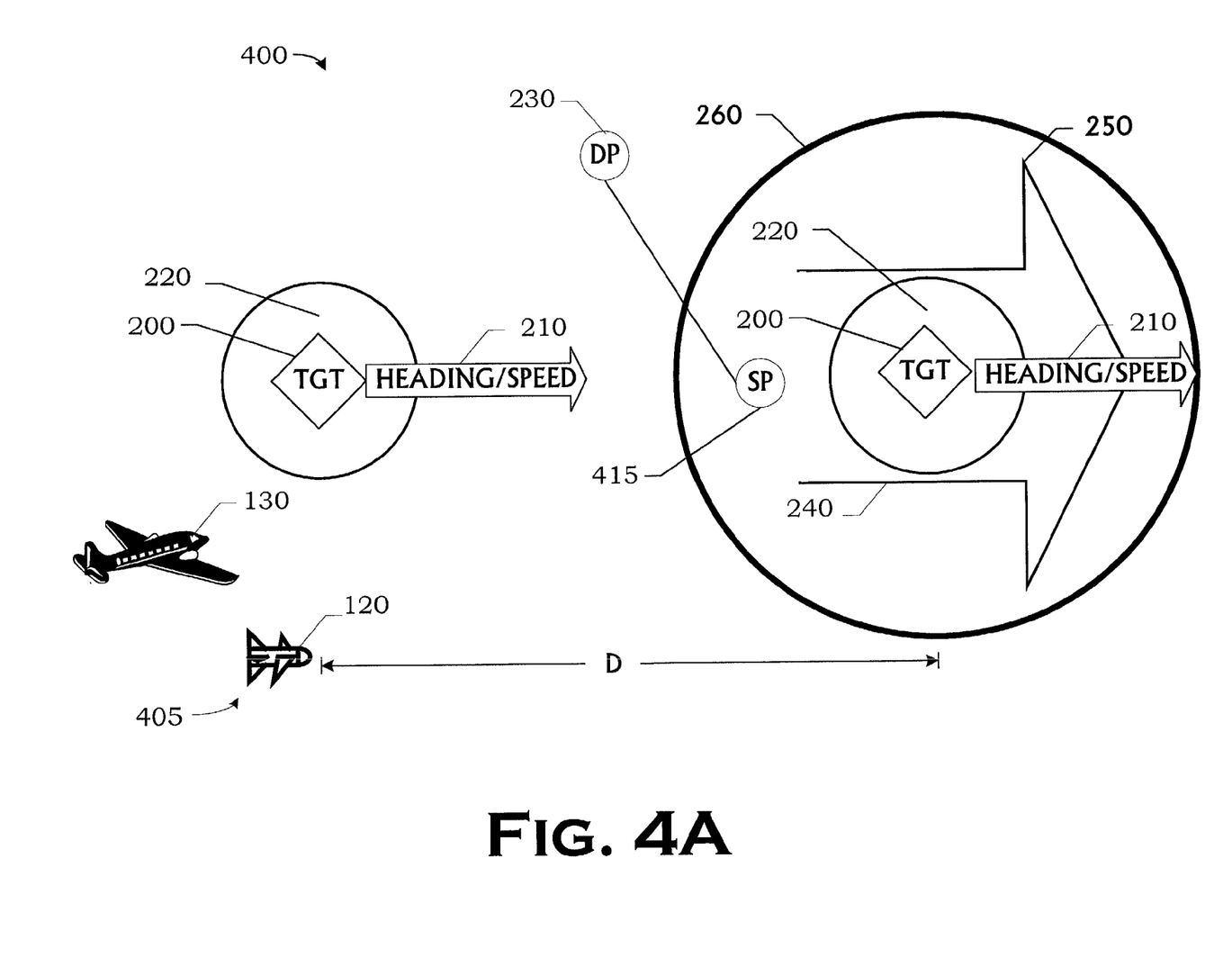
FIG. 4A and FIG. 4B conceptually illustrate a pattern from a mission profile developed in accordance with one particular embodiment of the present invention.
Figure 4B:
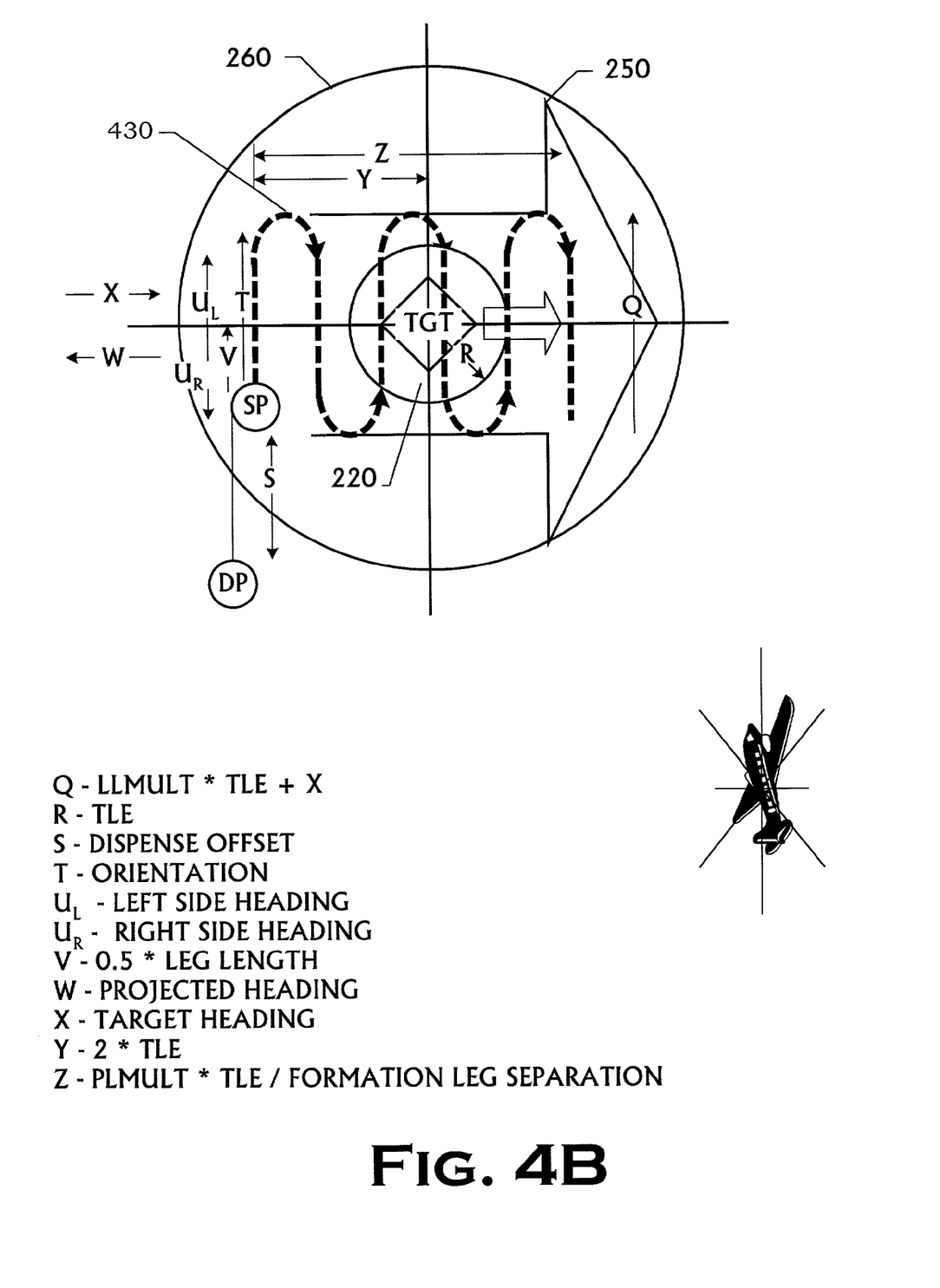

One particular embodiment 400 is conceptually illustrated in FIG. 4A and FIG. 4B. In this particular embodiment 400, the autonomous determination is performed in accordance with the method 500 in FIG. 5, which is graphically illustrated in FIG. 4B. The platform 130 dispenses a single formation 405 at the dispense point 230 whereupon the vehicle 120 proceeds to a start point 410 to begin searching on the pattern (consisting of a single trace 415) determined in accordance with the method 500. The start point 410 is derived from the target location 200, the target heading and speed 210, and the target location error 220.

Note that, in this particular embodiment, the heading/speed 210 can be assumed. However, should an incorrect assumption be made, the pattern will be implemented in an incorrect location, and the target will probably not be located. Thus, the heading/speed 210 should be known or estimated with some reasonable degree of accuracy, which degree is also reflected in the TLE 220 that determines the size of the pattern area 240. Note that the target heading/speed 210 is a special case of the target velocity in which the target's altitude is disregarded or assumed to be zero.

Figure 5:
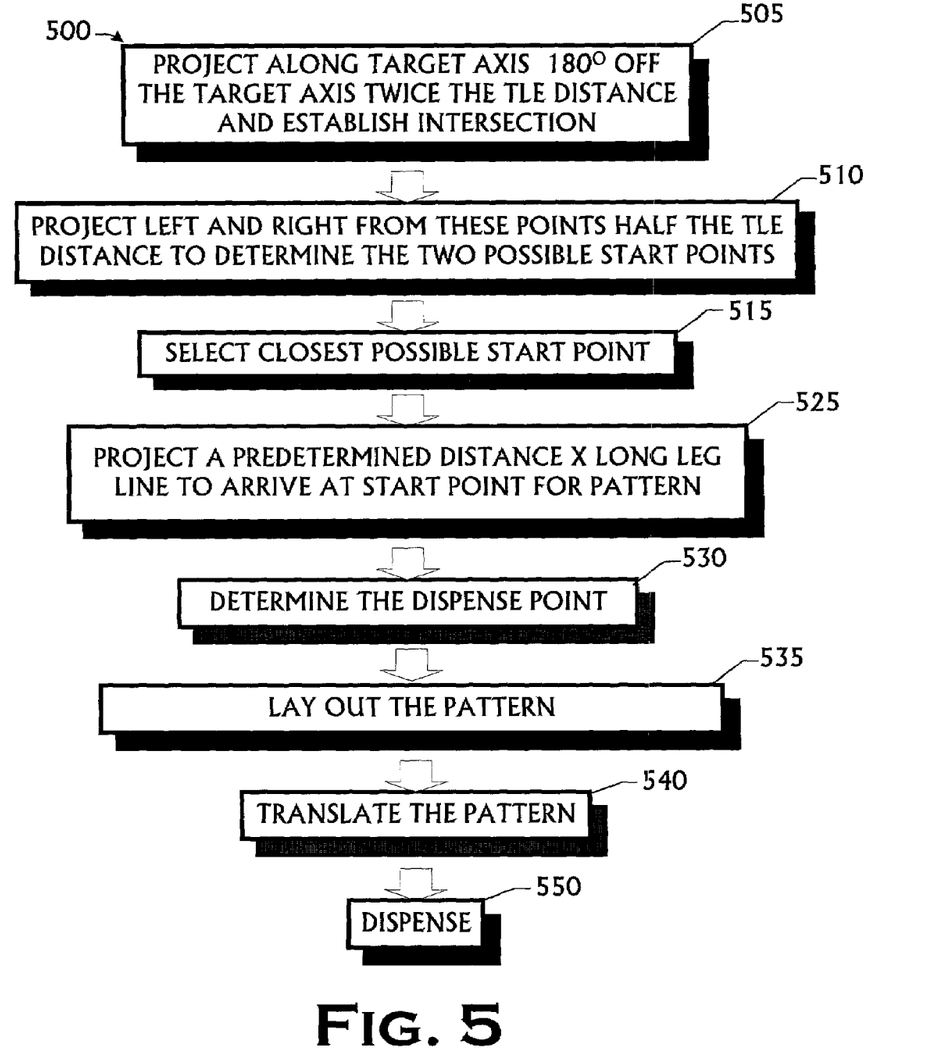
FIG. 5 illustrates one particular implementation of a method for determining the pattern in FIG. 4A and FIG. 4B.
Figure 6:
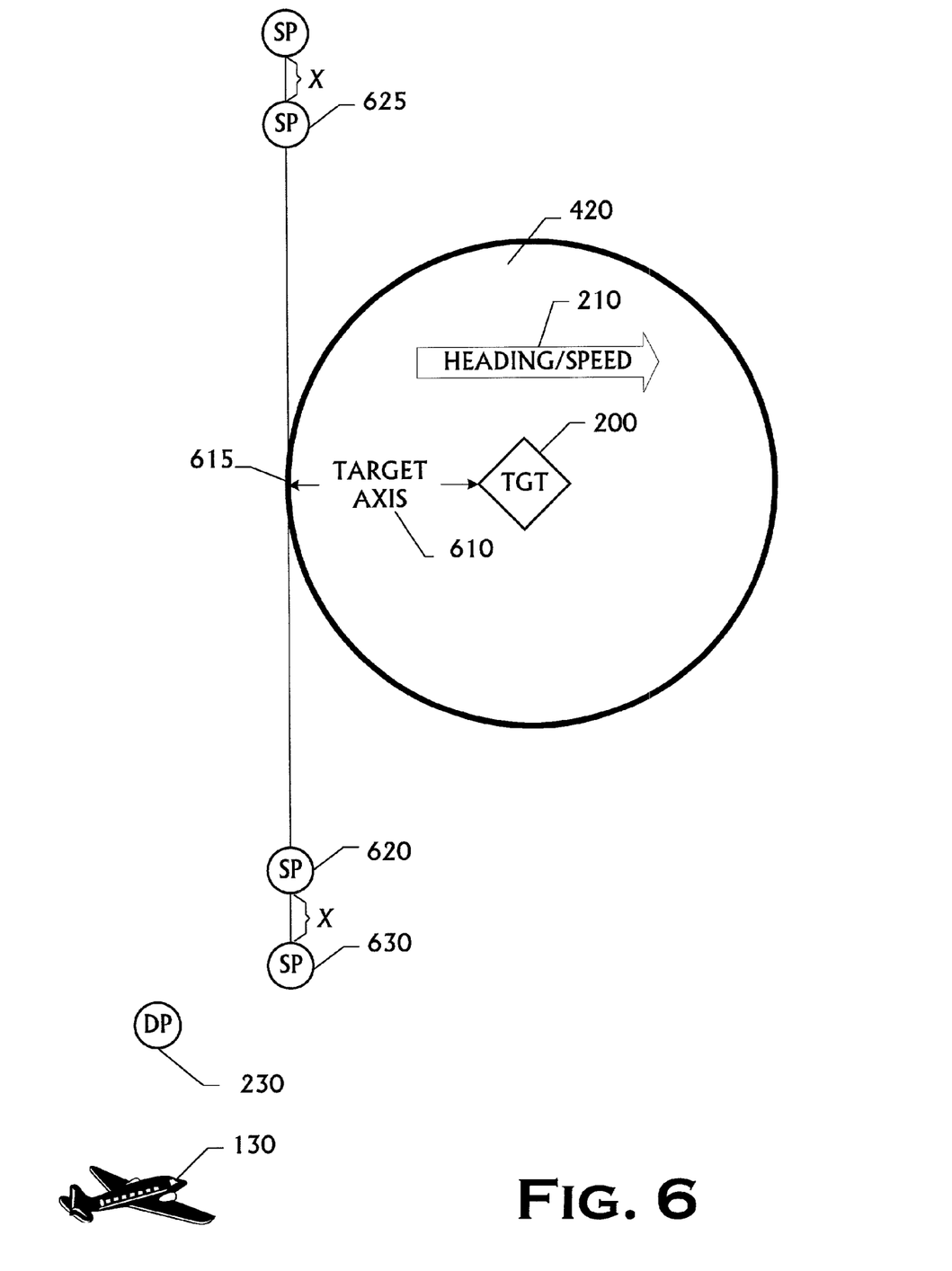
FIG. 6 conceptually illustrates intermediate steps in determining the pattern in FIG. 4A and FIG. 4B in accordance with the implementation of FIG. 5.

Referring now to FIG. 5 and FIG. 6, the method 500 begins by projecting along a target axis 610 in a direction opposite the target heading 210 a distance of twice the TLE to establish the intersection 615 between the target axis 610 and the TLE 420, as set forth in the box 505. In one embodiment, "opposite" means 180°, but a precise 180° is not required. Note that the target axis 610 is defined by the heading 210 of the target and the target's location 200. This projection establishes the perpendicular orientation of the pattern relative to the target's heading 210, which tends to improve performance. Thus, it is desirable to ascertain a true heading 210 instead of assuming one. Note, however, that assuming the heading does not prevent implementation of the present invention, but merely affects the orientation of the pattern relative to the target's heading. Similarly, knowing the target's speed is also desirable, as it permits a smaller TLE 420, but a target speed may be assumed and reflected in a larger magnitude for the TLE 420.

The method 500 then proceeds by projecting perpendicularly "left" and "right" from the intersection 615 to identify two start points 620, 625, as set forth in the box 510. More technically, the method 500 projects ±90° relative to the target heading 210 from the intersection 615. Note that some embodiments might not necessarily project perfectly perpendicularly relative to the target axis so long as the resulting start point 620 results in a pattern covering the entire area of interest. The projections are of such a length that the start points 620, 625, are at least as great as the TLE distance. The TLE distance was predetermined in the illustrated embodiment. In the illustrated embodiment, this is accomplished by projecting one-half the leg length, which is previously determined along with the number of legs in a manner discussed more fully below.

The method 500 then selects the start point 620, 625 that is closest to the platform 130, as is set forth in the box 515. This is done in the illustrated embodiment by calculating the distance from the platform 130 to the start points 620, 625 and selecting the shortest distance. In the illustrated embodiment, the single closest start point is 620, and so the start point 620 is selected. Note that some embodiments might employ a vehicle that performs "blind turns" between the legs of a trace, i.e., turns during which the vehicle cannot scan the TLE 420. In these embodiments, the adjusted start point 410 should be adjusted yet again to ensure full coverage of the TLE 420. More particularly, the start point 410 should be moved along the leg line an amount equal to the turning radius of the vehicle. The method 500, in this particular embodiment, next projects a distance X along the leg line to find an ultimate start point 630, as set forth in the box 525. Note that this penultimate adjustment may be performed even in embodiments that do not employ vehicles that perform blind turns to better ensure full coverage of the TLE 420.

The method 500 next determines the dispense point 230, as set forth in the box 530. In the illustrated embodiment, the method 500 determines the dispense point 230 by calculating a "dispense offset" from the start point 620. The dispense offset is the difference in the dispense altitude and the start altitude (both previously determined in accordance with conventional practice) multiplied by the glide ratio. The dispense offset is then applied to the start point 620 to calculate the dispense point 230.

The method 500 then lays out the pattern, i.e., the serpentine trace 430 in FIG. 4B, as set forth in the box 535.

Note, however, the other trace types may be employed in alternative embodiments. For instance, some embodiments employ a "fan blade" trace such as is known in the art. Any suitable trace type known to the art may be employed.

Laying out the pattern typically involves determining the leg length, any necessary turn radius, the leg separation, and the pattern orientation relative to the start point 630. This may be done in conventional fashion once the start point 410 has been determined in accordance with the present invention. The altitude/depth and the leg separation are provided as part of a preliminary mission profile or are otherwise previously determined. In one implementation, the number of legs Z of the pattern is the TLE divided by the leg separation multiplied by a "pattern length multiplier" PLMULT. The pattern multiplier PLMULT an integer number greater or equal to 1 used to ensure that the pattern is of sufficient length. For instance, a greater uncertainty in the speed of the target might militate for a longer pattern, which can be accomplished by increasing the pattern multiplier PLMULT. At a minimum, in this particular implementation, the number of legs is at least four times the TLE. The leg length Q is the product of a leg length multiplier LLMULT and the TLE plus any distance X desirable to account for a blind turn radius. In this particular implementation, the dispense altitude, formation altitude, formation leg separation, pattern length multiplier, leg length multiplier, and vehicle separation are predetermined either as part of the preliminary mission profile, or otherwise stored away, or transmitted to the platform 120.

The method 500 then translates the pattern, as set forth in the box 540. In the illustrated embodiment, the method 500 calculates the distance from the dispense point 230 to the platform 130, the arrival time of the vehicles 120 to the start point 620, the elapsed time of flight from the platform 130 to the dispense point 230 and from the dispense point 230 to the start point 620, and the target movement during that elapsed time. The method 500 then adjusts the pattern, including the dispense point 230 and the start point 620, the distance the target will move during that elapsed time along the target axis 610.

In the illustrated embodiment, the method 500 concludes by dispensing the formation 405, as set forth in the box 550. The formation 405 is dispensed from the platform 130 at the dispense point 230 in accordance with the mission profile. The platform azimuth, distance and the tactical munitions dispenser ("TMD") glide ratio at the dispense point 230 may be predetermined either as part of the preliminary mission profile, or otherwise stored away, or transmitted to the platform 120.

The platform 130 is shown dispensing a single vehicle 120 constituting a formation 405 of one. Various implementations of this particular embodiment may employ formations 405 of varying numbers. One particular implementation employs a formation 405 of four vehicles 120 for what is known as a "flight of four." However, various implementations may use varying numbers of vehicles 120 in the formation 405. Where the formation 405 comprise more than a single vehicle 120, the formation 405 is centered on the trace 430.

Some aspects of the present invention are software implemented. Some portions of the detailed descriptions herein are consequently presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantifies. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

Figure 7:
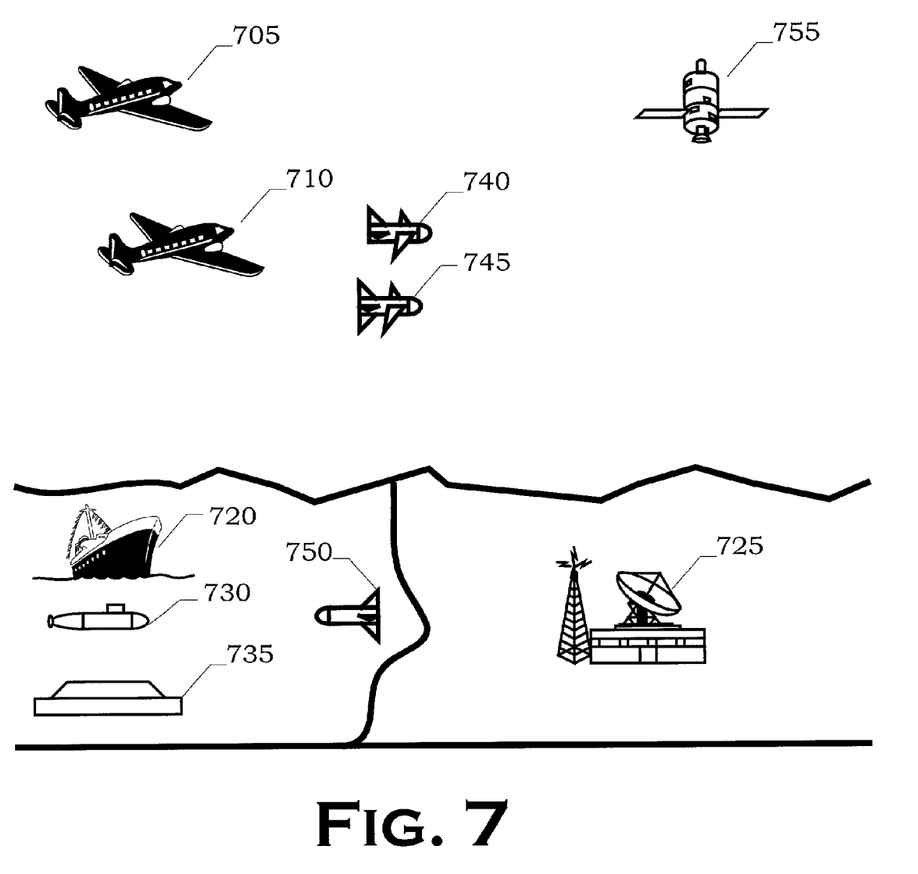
FIG. 7 conceptually illustrates various mission scenarios with which the invention may be implemented.

FIG. 7 illustrates some of the variations that may be found in various implementations of the present invention. The target may be:

airborne, e.g., the aircraft 705, 710, or the satellite 715;
surface based, e.g., the ship 720 or the ground facility 725; or
submerged underwater, e.g., the submarine 730 or the submerged weapons barge 735.

The nature and expected identity of the target will strongly influence the nature of the vehicle, as will the goal of the mission. For instance:

if the goal is simply to locate and/or identify the target, the vehicle(s) may be implemented using reconnaissance drones such as the drone 740;
if the target is to be destroyed, then the vehicle may be implemented using a guided weapon 745, such as a flying submunition or a cruise missile, if the target is airborne or surface based,
if the target is to be destroyed, then the vehicle may be implemented using a guided weapon such as the SONAR-equipped torpedo 750 if the target is submerged.

Similarly, the dispensing platform may be:

airborne, e.g., the aircraft 705, 710, or the satellite 715;
surface based, e.g., the ship 720 or the ground facility 725; or
submerged underwater, e.g., the submarine 730 or the submerged weapons barge 735.

Still other variations in the nature of the target, vehicle, and dispensing platform may become apparent to those skilled in the art and are included within scope and spirit of the invention.

Other aspects of the invention are similarly subject to variation. Other than the target location, the target information may be ascertained by observation or assumed at some value. The target location information must be observed or otherwise determined and cannot be assumed. The vehicle may directly ascertain the target information itself, or receive it from, for example, any one or more of the aircraft 705, 710, satellite 715, ship 720, ground facility 725, submarine 730, submerged weapons barge 735, or the satellite 755. Furthermore, the target information may be ascertained either before or after the vehicle is dispensed, depending on the implementation. Again, still other variations in the nature of the target, vehicle, and dispensing platform may become apparent to those skilled in the art and are included within scope and spirit of the invention.

Figure 8A:
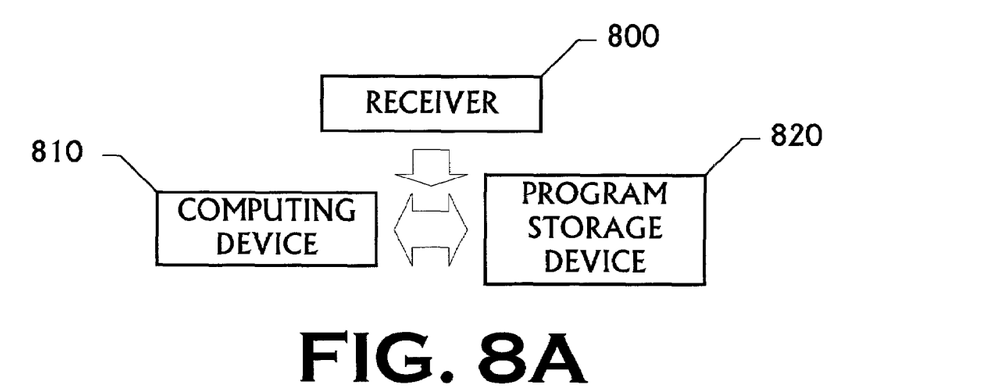
FIG. 8A to FIG. 8D illustrate various, alternative hardware implementations of the present invention.
Figure 8B:
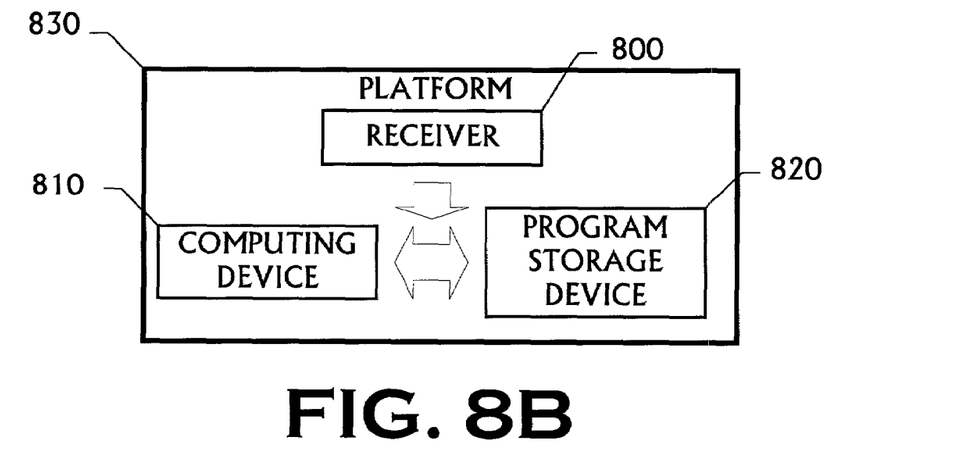
Figure 8C:
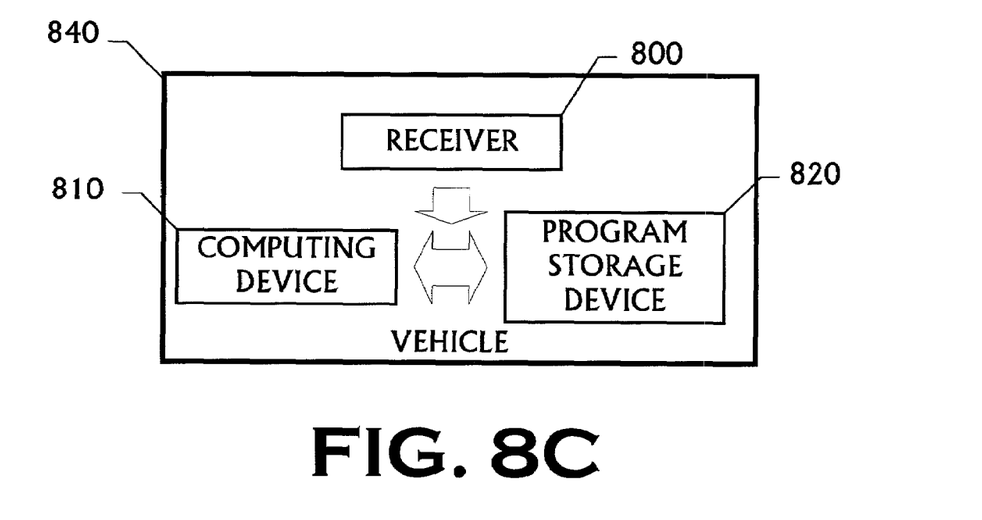
Figure 8D:
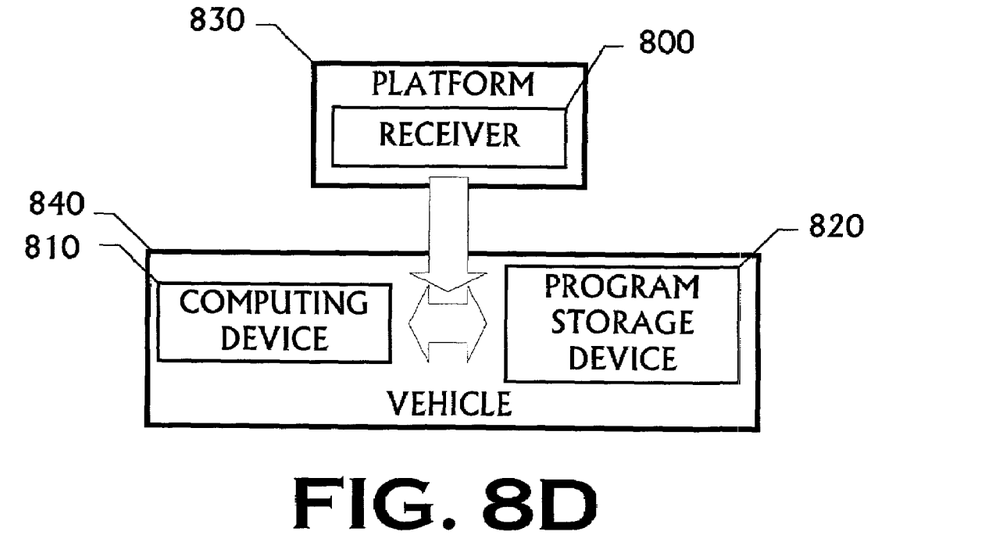

Thus, note the flexibility with which various embodiments might implement the hardware. Referring now to FIG. 8A, generally speaking, the hardware comprises a receiver 800 by which the target information, or at least the target location, may be received; a computing device 810, and a program storage device 820. The program storage device 820 is encoded with instructions that, when executed by the computing device 810, perform the method 500 of FIG. 5, using the target information received via the receiver 800 or estimated as discussed above. However, the receiver 800, computing device 810, and the program storage device 820 may all comprise a portion of a platform 830, as shown in FIG. 8B, a portion of a vehicle 840 as shown in FIG. 8C, or distributed across the platform 830 and the vehicle 840, as shown in FIG. 8D.

Figure 9:
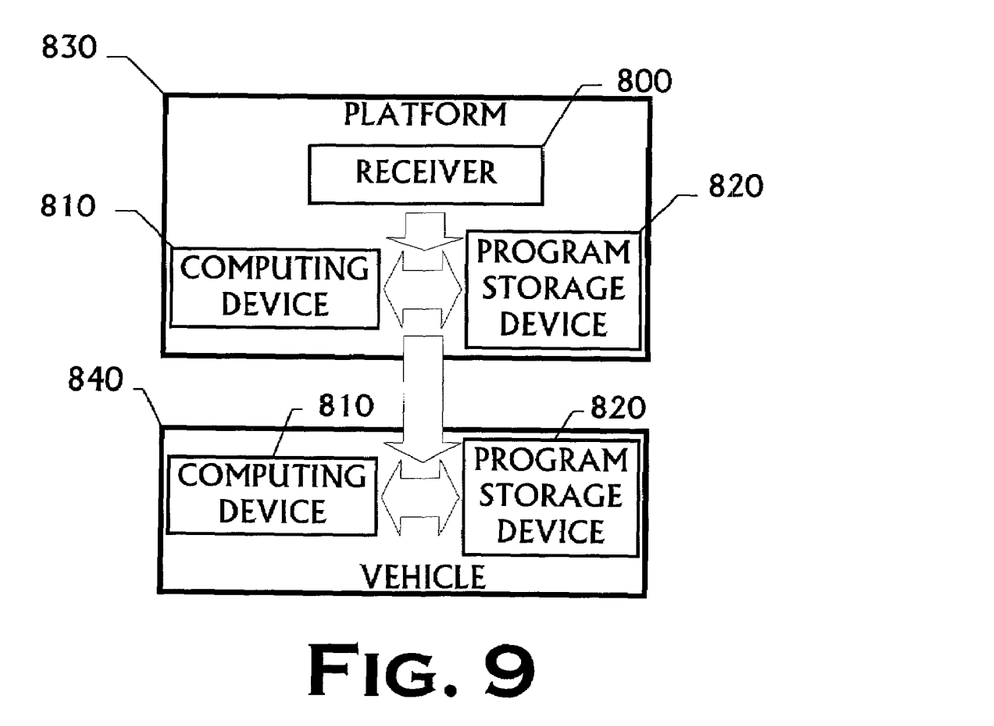
FIG. 9 illustrates one particular hardware implementation for the embodiment illustrated from FIG. 4A to FIG. 6.

FIG. 9 illustrates one particular hardware implementation of the embodiment shown in FIG. 4A to FIG. 8. The platform 830 includes a receiver 800, a computing device 810, and a program storage device 820. A vehicle 840 includes a computing device 810 and a program storage device 820. In operation, the platform 830 receives the target information, including at least the target location, via the receiver 800. The computing device 810 invokes the software encoded on the program storage device 820 to autonomously determine a pattern in accordance with method 500 of FIG. 5. Once the pattern is autonomously determined, it is downloaded to the vehicle 840 via the computing device 810 and stored into the program storage device 820. The platform 800 then dispenses the vehicle 840 which then flies to the start point and implements the trace.

This concludes the detailed description. The following references are hereby incorporated by reference for all purposes as if set forth herein verbatim:

U.S. application Ser. No. 09/847,224, entitled "Autonomous Mission Profile Planning," filed on an even date herewith in the name of William V. Harding, and commonly assigned herewith.

U.S. application Ser. No. 09/263,411, entitled "Dual Mode Semi-Active Laser/Laser Radar Seeker," filed Mar. 5, 1999, in the name of the inventor Lewis G. Minor, now assigned to Lockheed Martin Corporation;

U.S. Pat. No. 5,893,085, entitled "Dynamic Fuzzy Logic Process for Identifying Objects in Three-Dimensional Data," issued Apr. 6, 1999, to Lockheed Martin Corporation as assignee of the inventor Ronald W. Phillips;

U.S. Pat. No. 5,898,483, entitled "Method for Increasing LADAR Resolution," issued Apr. 27, 1999, to Lockheed Martin Corporation as assignee of the inventor Edward Max Flowers;

U.S. Pat. No. 5,285,461, entitled "Improved Laser RADAR Transceiver," issued Feb. 5, 1994, to Loral Vought Systems Corporation (now Lockheed Martin Corporation) as assignee of the inventors Nicholas J. Krasustsky and Lewis G. Minor;

U.S. Pat. No. 5,224,109, entitled "Laser RADAR Transceiver," issued Jun. 29, 1993, to LTV Missiles and Electronics Group (now Lockheed Martin Corporation) as assignee of the inventors Nicholas J. Krasustsky and Lewis G. Minor; and U.S. Pat. No. 5,200,606, entitled "Laser RADAR Scanning System," issued Apr. 6, 1993, to LTV Missiles and Electronics Group (now Lockheed Martin Corporation) as assignee of the inventors Nicholas J. Krasustsky, Lewis G. Minor, and Edward M. Flowers.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for planning a mission profile in real time, comprising:
    ascertaining a plurality of target information, including a target location, a target velocity, and a target location error; and
    autonomously determining a pattern from the ascertained target information.

2. The method of claim 1, wherein ascertaining the target information includes assuming a value for at least one of the target velocity and the target location error.

3. The method of claim 1, wherein ascertaining the plurality of target information includes ascertaining a target location that places the target in the air, on the surface, or submerged underwater.

4. The method of claim 1, wherein ascertaining the plurality of target information includes receiving at least one of the target location, target velocity, and target location error in a transmission.

5. The method of claim 1, further comprising:
    dispensing at least a formation including at least one vehicle; and
    implementing the pattern with the vehicle.

6. The method of claim 5, wherein ascertaining the target information includes:
    acquiring the target information at a platform from which the formation is dispensed;
    receiving at least the target location from a platform other than the platform from which the formation is dispensed; or
    acquiring the target information aboard the vehicle.

7. The method of claim 5, wherein dispensing the formation includes:
    launching the formation from an airborne platform; or
    launching the formation from a surface-based platform; or
    launching the formation from an underwater platform.

8. The method of claim 5, wherein the vehicle includes a vehicle selected from the group consisting of a submersible vehicle, a reconnaissance drone, a flying submunition, a cruise missile, and a smart bomb.

9. The method of claim 1, wherein autonomously determining the pattern from the ascertained target information includes autonomously determining a serpentine pattern or a fan blade pattern.

10. The method of claim 1, wherein autonomously determining the pattern from the ascertained target information includes:
projecting along a target axis a direction opposite a target heading defined by the target velocity a distance of at least twice the target location error to establish an intersection of the target axis with the target location error;
projecting left and right relative to the target axis from the intersection a distance at least as great as one-half the target location error to determine a pair of possible start points;
selecting the possible start point closest to the platform;
determining a dispense point;
laying out a trace from the selected start point; and
translating the trace along a heading defined by the target velocity a distance determined by the elapsed time of travel for the platform to the dispense point and for a vehicle from the dispense point to the start point.

11. The method of claim 10, further comprising:
dispensing a formation including at least one vehicle, at the dispense point defined by the preplanned mission profile; and
implementing the pattern with the formation at the selected start point.

12. The method of claim 11, further comprising adjusting the selected start point by a predetermined distance along a leg of the trace.

13. The method of claim 10, wherein projecting along the target axis opposite the target heading includes projecting 180° relative to the target heading.

14. The method of claim 10, wherein projecting left and right includes projecting ±90°.

15. The method of claim 1, further comprising identifying the target.

16. The method of claim 15, wherein identifying the target includes employing an automatic target recognition system.

17. The method of claim 15, further comprising attacking the target.

18. A method for planning a mission profile in real time, comprising:
ascertaining a plurality of target information, including a target location, a target velocity, and a target location error; and
autonomously determining a pattern including a trace from the ascertained target information, including:
projecting along a target axis a direction opposite a target heading defined by the target velocity a distance of at least twice the target location error to establish an intersection of the target axis with the target location error;
projecting left and right relative to the target axis from the intersection a distance at least as great as one-half the target location error to determine a pair of possible start points;
selecting the possible start point closest to the platform;
determining a dispense point;
laying out a trace from the selected start point; and
translating the trace along a heading defined by the target velocity a distance determined by the elapsed time of travel for the platform to the dispense point and for a vehicle from the dispense point to the start point.

19. The method of claim 18, wherein ascertaining the target information includes assuming a value for at least one of the target velocity and the target location error.

20. The method of claim 18, wherein ascertaining the plurality of target information includes ascertaining a target location that places the target in the air, on the surface, or submerged underwater.

21. The method of claim 18, wherein ascertaining the plurality of target information includes receiving at least one of the target location, target velocity, and target location error in a transmission.

22. The method of claim 18, further comprising:
dispensing at least a formation including at least one vehicle; and
implementing the pattern with the vehicle.

23. The method of claim 22, wherein ascertaining the target information includes:
acquiring the target information at a platform from which the formation is dispensed;
receiving at least the target location from a platform other than the platform from which the formation is dispensed; or
acquiring the target information aboard the vehicle.

24. The method of claim 22, wherein dispensing the formation includes:
launching the formation from an airborne platform; or
launching the formation from a surface-based platform; or
launching the formation from an underwater platform.

25. The method of claim 22, wherein the vehicle includes a vehicle selected from the group consisting of a submersible vehicle, a reconnaissance drone, a flying submunition, a cruise missile, and a smart bomb.

26. The method of claim 18, wherein autonomously determining the pattern from the ascertained target information includes autonomously determining a serpentine pattern or a fan blade pattern.

27. The method of claim 18, further comprising:
dispensing a formation including at least one vehicle at the dispense point defined by the preplanned mission profile; and
implementing the pattern with the formation at the selected start point.

28. The method of claim 27, further comprising adjusting the selected start point by a predetermined distance along a leg the trace.

29. The method of claim 18, wherein projecting along the target axis opposite the target heading includes projecting 180° relative to the target heading.

30. The method of claim 18, wherein projecting left and right includes projecting ±90°.

31. The method of claim 18, further comprising identifying the target.

32. The method of claim 31, wherein identifying the target includes employing an automatic target recognition system.

33. The method of claim 31, further comprising attacking the target.

34. An apparatus for use in planning a mission profile in real time, comprising:
a receiver capable of receiving a plurality of target information, the target information including a target location;
a computing device; and
a program storage device encoded with instructions that, when executed by the computing device, perform a method for autonomously determining a pattern from the target information.

35. The apparatus of claim 34, wherein the method for autonomously determining the pattern from the target information includes assuming a value for at least one of a target velocity and a target location error.

36. The apparatus of claim 34, wherein the receiver, the computing device, and the program storage device are distributed across a platform and a vehicle.

37. The apparatus of claim 36, wherein the platform is an airborne platform, a surface platform, or a submerged platform.

38. The apparatus of claim 36, wherein the vehicle includes a vehicle selected from the group consisting of a submersible vehicle, a reconnaissance drone, a flying submunition, a cruise missile, and a smart bomb.

39. The apparatus of claim 34, wherein the receiver, the computing device, and the program storage device comprise a portion of a platform.

40. The apparatus of claim 39, wherein the platform is an airborne platform, a surface platform, or a submerged platform.

41. The apparatus of claim 34, wherein the receiver, the computing device, and the program storage device comprise a portion of a vehicle.

42. The apparatus of claim 41, wherein the vehicle includes a vehicle selected from the group consisting of a submersible vehicle, a reconnaissance drone, a flying submunition, a cruise missile, and a smart bomb.

43. The apparatus of claim 34, wherein the encoded method for autonomously determining the pattern from the ascertained target information includes autonomously determining a serpentine pattern or a fan blade pattern.

44. The apparatus of claim 34, wherein the encoded method for autonomously determining the pattern includes:
projecting along a target axis 180° off the target velocity a distance of at least twice the target location error to establish an intersection of the target axis with the target location error;
projecting left and right relative to the target axis from the intersection a distance at least as great as one-half the target location error to determine a pair of possible start points;
selecting the possible start point closest to the platform;
determining a dispense point;
laying out a trace from the selected start point; and
translating the trace along a heading defined by the target velocity a distance determined by the elapsed time of travel for the platform to the dispense point and for a vehicle from the dispense point to the start point.

45. The apparatus of claim 44, wherein the encoded method for autonomously determining the pattern further comprises adjusting the selected start point by a predetermined distance along a leg of the trace.

46. The apparatus of claim 44, wherein the projecting along the target axis opposite the target heading in the encoded method includes projecting 180° relative to the target heading.

47. The apparatus of claim 44, wherein projecting left and right in the encoded method includes projecting ±90°.

48. The apparatus of claim 34, further comprising an automatic target recognition system.

49. The apparatus of claim 48, wherein the method for autonomously determining the pattern further comprises identifying the target.

50. An apparatus for planning a mission profile in real time, comprising:
a receiver capable of receiving a plurality of target information, the target information including a target location;
a computing device; and
a program storage device encoded with instructions that, when executed by the computing device, perform a method for autonomously determining a pattern from the ascertained target information, the method including:
projecting along a target axis a direction opposite a target heading defined by the target velocity a distance of at least twice the target location error to establish an intersection of the target axis with the target location error;
projecting left and right relative to the target axis from the intersection a distance at least as great as one-half the target location error to determine a pair of possible start points;
selecting the possible start point closest to the platform;
determining a dispense point;
laying out a trace from the selected start point; and
translating the trace along a heading defined by the target velocity a distance determined by the elapsed time of travel for the platform to the dispense point and for a vehicle from the dispense point to the start point.

51. The apparatus of claim 50, wherein the method for autonomously determining the pattern from the target information includes assuming a value for at least one of a target velocity and a target location error.

52. The apparatus of claim 50, wherein the receiver, the computing device, and the program storage device are distributed across a platform and a vehicle.

53. The apparatus of claim 52, wherein the platform is an airborne platform, a surface platform, or a submerged platform.

54. The apparatus of claim 52, wherein the vehicle includes a vehicle selected from the group consisting of a submersible vehicle, a reconnaissance drone, a flying submunition, a cruise missile, and a smart bomb.

55. The apparatus of claim 50, wherein the receiver, the computing device, and the program storage device comprise a portion of a platform.

56. The apparatus of claim 55, wherein the platform is an airborne platform, a surface platform, or a submerged platform.

57. The apparatus of claim 50, wherein the receiver, the computing device, and the program storage device comprise a portion of a vehicle.

58. The apparatus of claim 57, wherein the vehicle includes a vehicle selected from the group consisting of a submersible vehicle, a reconnaissance drone, a flying submunition, a cruise missile, and a smart bomb.

59. The apparatus of claim 50, wherein the method for autonomously determining the pattern from the ascertained target information includes autonomously determining a serpentine pattern or a fan blade pattern.

60. The apparatus of claim 50, wherein the method for autonomously determining the pattern further comprises adjusting the selected start point by a predetermined distance along a leg of the trace.

61. The apparatus of claim 50, wherein projecting along the target axis opposite the target heading in the encoded method includes projecting 180° relative to the target heading.

62. The apparatus of claim 50, wherein projecting left and right in the encoded method includes projecting ±90°.

63. The apparatus of claim 50, further comprising an automatic target recognition system.

64. The apparatus of claim 63, wherein the method for autonomously determining the pattern further comprises identifying the target.

65. An apparatus capable of planning a mission profile in real time, comprising:
a platform, including
a receiver capable of receiving a plurality of target information, the target information including a target location;
a first computing device; and
a first program storage device encoded with instructions that, when executed by the computing device, perform a method for autonomously determining a pattern from the ascertained target information, the method including:
projecting along a target axis a direction opposite a target heading defined by the target velocity a distance of at least twice the target location error to establish an intersection of the target axis with the target location error;
projecting left and right relative to the target axis from the intersection a distance at least as great as one-half the target location error to determine a pair of possible start points;
selecting the possible start point closest to the platform;
determining a dispense point;
laying out a trace from the selected start point; and
translating the trace along a heading defined by the target velocity a distance determined by the elapsed time of travel for the platform to the dispense point and for a vehicle from the dispense point to the start point; and
a vehicle, including:
a second program storage device capable of being encoded with the pattern by the first computing device; and
a second computing device capable of implementing the pattern encoded on the second program storage device through control of the vehicle.

66. The apparatus of claim 65, wherein the method for autonomously determining the pattern from the target information includes assuming a value for at least one of a target velocity and a target location error.

67. The apparatus of claim 65, wherein the platform is an airborne platform, a surface platform, or a submerged platform.

68. The apparatus of claim 65, wherein the vehicle includes a vehicle selected from the group consisting of a submersible vehicle, a reconnaissance drone, a flying submunition, a cruise missile, and a smart bomb.

69. The apparatus of claim 65, wherein the method for autonomously determining the pattern from the ascertained target information includes autonomously determining a serpentine pattern or a fan blade pattern.

70. The apparatus of claim 65, wherein the method for autonomously determining the pattern further comprises adjusting the selected start point by a predetermined distance along a leg of the trace.

71. The apparatus of claim 65, wherein projecting along the target axis opposite the target heading in the encoded method includes projecting 180° relative to the target heading.

72. The apparatus of claim 65, wherein projecting left and right in the encoded method includes projecting ±90°.

73. The apparatus of claim 65, further comprising an automatic target recognition system.

74. The apparatus of claim 73, wherein the method for autonomously determining the pattern further comprises identifying the target.

75. An apparatus for planning a mission profile in real time, comprising:
means for ascertaining a plurality of target information, including a target location, a target velocity, and a target location error; and
means for autonomously determining a pattern from the ascertained target information.

* * * * *